US011935223B2

(12) United States Patent
Harrup et al.

(10) Patent No.: US 11,935,223 B2
(45) Date of Patent: *Mar. 19, 2024

(54) MOBILE MULTI-FEATURE PRODUCT AUTHENTICATION

(71) Applicant: Altria Client Services LLC, Richmond, VA (US)

(72) Inventors: Kevin Harrup, Hopewell, VA (US); Rosana Altoveros, Richmond, VA (US); Mike Shaw, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 266 days.

This patent is subject to a terminal disclaimer.

(21) Appl. No.: 17/565,559

(22) Filed: Dec. 30, 2021

(65) Prior Publication Data

US 2022/0122245 A1 Apr. 21, 2022

Related U.S. Application Data

(63) Continuation of application No. 15/948,320, filed on Apr. 9, 2018, now Pat. No. 11,216,933.

(51) Int. Cl.
*G06K 9/00* (2022.01)
*A61K 35/12* (2015.01)
(Continued)

(52) U.S. Cl.
CPC .......... *G06T 7/0004* (2013.01); *G06F 16/955* (2019.01); *G06K 19/06046* (2013.01)

(58) Field of Classification Search
CPC .......... G06Q 20/00; G06K 9/00; G06F 21/36; A61K 35/12
(Continued)

(56) References Cited

U.S. PATENT DOCUMENTS 7,063,264 B2  6/2006  Bi et al.
7,605,940 B2  10/2009  Silverbrook et al.
(Continued)

OTHER PUBLICATIONS

Ross, Hana, "Measures to Control Illicit Tobacco Trade," Economics of Tobacco Control Project, University of Cape Town, Jun. 14, 2015 (Draft), available at http://tobacconomics.org/wp-content/uploads/2015/08/Ross_Available_Measures_8.06.15.pdf, retrieved on Mar. 28, 2015.

(Continued)

*Primary Examiner* — Seyed H Azarian
(74) *Attorney, Agent, or Firm* — Harness, Dickey & Pierce, P.L.C.

(57) ABSTRACT

A method, non-transitory computer readable medium, system and/or mobile device for authenticating security features, the mobile device for authenticating security features includes at least one sensor for detecting security features, a memory having stored thereon computer readable instructions, and at least one processor configured to execute the computer readable instructions to receive a target image of a product to be authenticated, the product including at least one security feature, identify the product to be authenticated based on the target image and product information stored in a product database, obtain sensor configuration information for the at least one sensor associated with the at least one security feature of the product based on the identified product, examine the at least one security feature of the product with the at least one sensor based on the obtained sensor configuration information, and authenticate the product based on results from the examination.

18 Claims, 5 Drawing Sheets

(51) Int. Cl.
    *G06F 16/955*     (2019.01)
    *G06K 19/06*     (2006.01)
    *G06T 7/00*     (2017.01)

(58) Field of Classification Search
    USPC ........ 382/100, 103, 106, 116, 123, 135–141,
            382/162, 168, 173, 181, 199, 209, 190,
            382/219, 224, 232, 254, 274, 276,
            382/286–291, 305, 312; 705/2, 17, 23
    See application file for complete search history.

(56) References Cited

U.S. PATENT DOCUMENTS

| | | |
|---|---|---|
| 7,667,217 B2 | 2/2010 | Kamijoh et al. |
| 7,843,613 B2 | 11/2010 | Wang et al. |
| 7,874,489 B2 | 1/2011 | Mercolino |
| 8,022,832 B2 | 9/2011 | Vogt et al. |
| 8,459,436 B2 | 6/2013 | Jenrick et al. |
| 8,517,274 B2 | 8/2013 | Ciurczak et al. |
| 9,034,168 B2 | 5/2015 | Khattak et al. |
| 9,053,616 B2 | 6/2015 | Grabiner et al. |
| 9,171,347 B2 | 10/2015 | Caton et al. |
| 9,195,870 B2 | 11/2015 | Rowe |
| 2004/0172537 A1 | 9/2004 | Baus et al. |
| 2004/0258274 A1 | 12/2004 | Brundage et al. |
| 2008/0002882 A1 | 1/2008 | Voloshynovskyy et al. |
| 2012/0104278 A1 | 5/2012 | Downing et al. |
| 2013/0223674 A1 | 8/2013 | Eckel et al. |
| 2014/0105449 A1 | 4/2014 | Caton et al. |
| 2014/0201094 A1 | 7/2014 | Herrington et al. |
| 2015/0302421 A1* | 10/2015 | Caton .............. G06K 19/06037 705/17 |
| 2016/0154939 A1* | 6/2016 | Grabiner ................... G06T 7/73 705/2 |
| 2016/0292950 A1* | 10/2016 | Czyzewski .......... G07D 7/0032 |
| 2016/0307035 A1* | 10/2016 | Schilling .............. B42D 25/378 |
| 2016/0314374 A1* | 10/2016 | Braumandl ............ H04N 23/11 |
| 2017/0249491 A1 | 8/2017 | MacIntosh et al. |
| 2017/0346851 A1* | 11/2017 | Drake ................... H04L 9/0838 |

OTHER PUBLICATIONS

International Search Report and Written Opinion thereof dated Jun. 21, 2019 for corresponding International Application No. PCT/US19/22897.

* cited by examiner

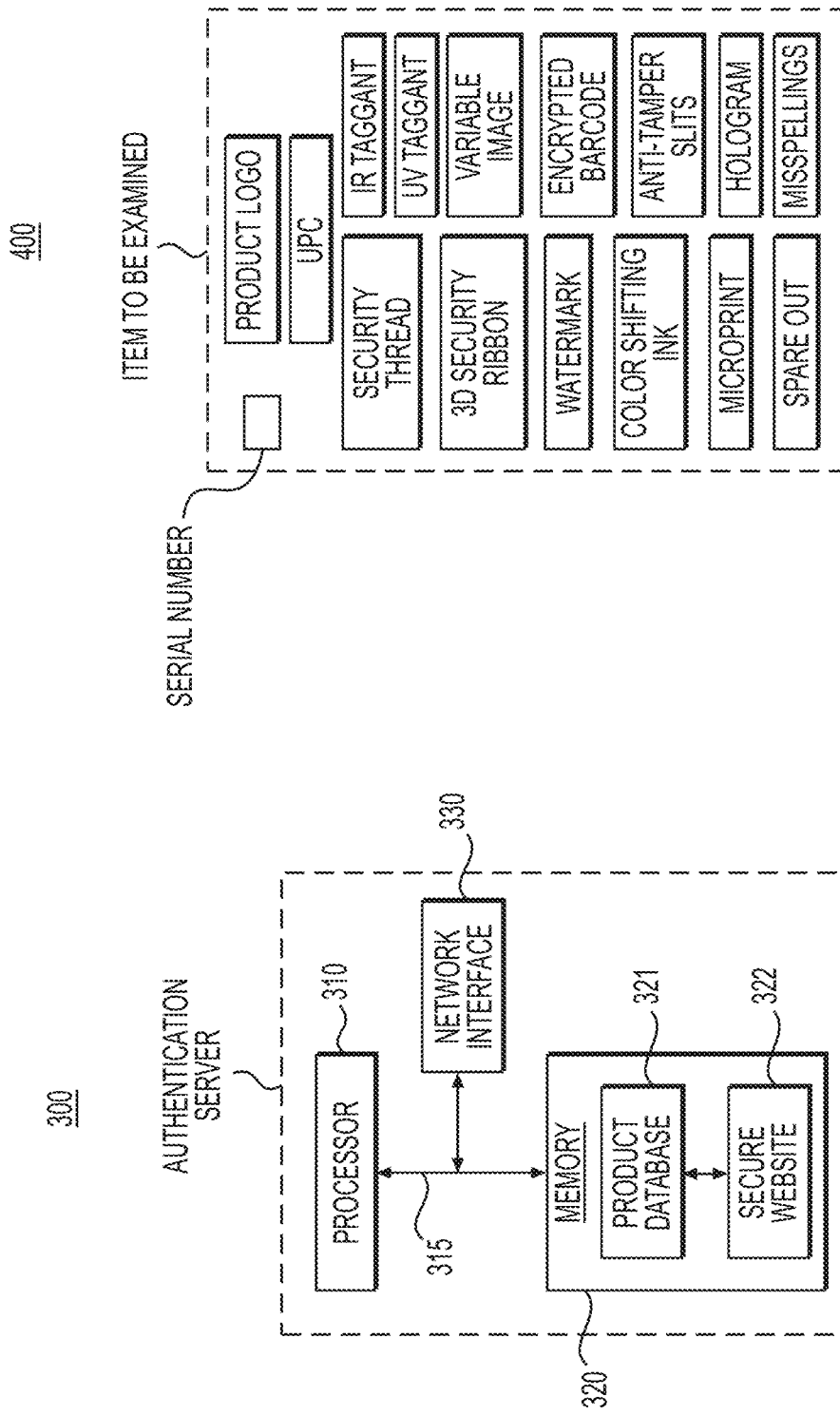

MOBILE MULTI-FEATURE PRODUCT AUTHENTICATION

CROSS-REFERENCE TO RELATED APPLICATIONS

The present application is a continuation of and claims priority under 35 U.S.C. §§ 120/121 to U.S. patent application Ser. No. 15/948,320, filed on Apr. 9, 2018, the entire contents of which is incorporated by reference in its entirety.

BACKGROUND

Field

The present disclosure relates to methods, systems, apparatuses and/or non-transitory computer readable media for authenticating security features of a product that includes multiple security features, and more specifically to systems and mobile devices for authenticating security features of a product that includes multiple security features, and methods and non-transitory computer readable media for the same.

Description

Various techniques currently exist for inspecting products, goods, packages, passports, drivers licenses, identification cards, currency notes, tax stamps, etc., to determine whether the article in question is genuine (i.e., not counterfeit) and/or authorized for sale/import/export (i.e., not smuggled). In particular, various security features may be placed on these items that require inspection. These various security features may be manufactured by various governments and private businesses, and therefore contain confidential and/or proprietary information. The presence of confidential and proprietary information leads the manufacturers of these security features to issue proprietary inspection tools that may be the only means to detect the confidential and/or proprietary security features. This issue leads to situations where inspectors, such as customs officials, immigration officers, law enforcement, tax officials, public officials, security personnel, brand holders, intellectual rights holders, merchants, etc., are required to keep and maintain a plurality of security inspection tools to inspect the plurality of security features that may be present on a single item. However, due to the confidential and/or proprietary nature of the security features, security features manufacturers are reluctant and/or resistant to provide information related to the security features to third parties and/or allow their security features to be compatible with other manufacturers' security inspection tools.

Additionally, because of the variety of security features that may be present on a single item, as well as the variety of items that a single inspector is expected to examine on a daily basis, the accuracy and efficiency of the inspections may be reduced and/or impaired due to all of the security feature related information and product specific information the inspector is required to memorize. For example, the inspector may be required to know (and/or consult various brand specific publications) information related to the different possible versions of a product that have been released, the security features that are present on each version of the product, sales/import/export restrictions on the product, etc., in order to properly determine whether the product is genuine and/or authorized for sale in a particular region.

Therefore, there exists a demand for a single mobile authentication device that eliminates the need for multiple proprietary security inspection tools. There also exists a demand for an automated system for inspecting items that include a plurality of security features. Additionally, there exists a demand for a secure authentication system that allows for the secure transfer of confidential and/or proprietary security feature information so that unauthorized persons are unable to use the security feature information to enable counterfeiting, smuggling, and/or tampering of the product.

SUMMARY

At least one example embodiment relates to a mobile device for authenticating security features. In at least one example embodiment, the mobile device includes at least one sensor for detecting security features, a memory having stored thereon computer readable instructions, and at least one processor configured to execute the computer readable instructions to receive a target image of a product to be authenticated, the product including at least one security feature, identify the product to be authenticated based on the target image and product information stored in a product database, obtain sensor configuration information for the at least one sensor associated with the at least one security feature of the product based on the identified product, examine the at least one security feature of the product with the at least one sensor based on the obtained sensor configuration information, and authenticate the product based on results from the examination.

In at least one example embodiment, the at least one processor is configured to obtain the sensor configuration information by, obtaining security feature type information of the at least one security feature and position information associated with an expected position of the at least one security feature using the product database and the identified product, and obtaining the sensor configuration information for the at least one sensor based on the obtained security feature type information.

In at least one example embodiment, the at least one security feature is a plurality of security features, and the at least one processor is configured to, for each security feature of the plurality of security features, obtain the sensor configuration information for the at least one sensor associated with the security feature, configure the at least one sensor based on the obtained sensor configuration information, and examine the security feature using the at least one sensor based on the position information of the security feature and the configured at least one sensor.

Some example embodiments provide that the mobile device may include at least one display panel, and the at least one processor is configured to examine the at least one security feature of the product by displaying, on the at least one display panel, instructions indicating a relative examination position of the at least one optical sensor based on the position information of the at least one security feature, determining whether the at least one sensor is properly positioned relative to the at least one security feature based on the relative examination position, and analyzing the at least one security feature using the at least one optical sensor that is positioned at the relative examination position.

In at least one example embodiment, the security feature type information includes at least one of a security thread, a three-dimensional (3-D) security ribbon, a watermark, a color-shifting ink, a microprint, a spare out, an infra-red (IR) taggant, an ultra-violet (UV) taggant, a variable image, an encrypted barcode, anti-tamper slits, a hologram, a magnetic ink, a conductive ink, a thermal ink, a hot stamping foil, or intentional misspellings.

In at least one example embodiment, the obtained sensor configuration information include sensor configuration settings related to at least one of a desired filtration setting, a desired fluorescence setting, a desired frequency response range, a desired absorption response range, a desired magnification setting, or a desired polarization setting.

In at least one example embodiment, the product includes at least one of a currency note, a banknote, a tax stamp, or a product packaging.

At least one example embodiment relates to a system for authenticating security features. In at least one example embodiment, the system includes at least one sensor for detecting security features, a memory having stored thereon computer readable instructions, and at least one processor configured to execute the computer readable instructions to, receive a target image of a product to be authenticated, the product including at least one security feature, identify the product to be authenticated based on the target image and product information stored in a first database, obtain sensor configuration information for the at least one sensor associated with the at least one security feature based on the identified product, examine the at least one security feature of the product with the at least one sensor based on the sensor configuration information, and authenticate the product based on results from the examination.

Some example embodiments provide that the system may include a server configured to store a second database, the second database including a plurality of product information, each of the product information including security feature information related to at least one security feature present in the product.

In at least one example embodiment, the first database is updated at a desired interval using the plurality of product information stored on the second database.

Some example embodiments provide that the system may be configured to host a secure website, the secure website including a user interface configured to allow a provider of the product or a provider of the at least one security feature to securely upload the product information or the security feature information to the second database.

In at least one example embodiment the at least one processor is configured to obtain the sensor configuration information by obtaining security feature type information of the at least one security feature and position information associated with the at least one security feature using the first database and the identified product, and obtaining the sensor configuration information for the at least one sensor based on the obtained security feature type information.

Some example embodiments provide that the system may include at least one display panel, and the at least one processor is configured to examine the at least one security feature of the product by displaying, on the at least one display panel, instructions indicating a relative examination position of the at least one optical sensor based on the position information of the at least one security feature, determining whether the at least one sensor is properly positioned relative to the at least one security feature based on the relative examination position, and analyzing the at least one security feature using the at least one optical sensor that is positioned at the relative examination position.

In at least one example embodiment, the security feature type information includes at least one of a security thread, a three-dimensional (3-D) security ribbon, a watermark, a color-shifting ink, a microprint, a spare out, an infra-red (IR) taggant, an ultra-violet (UV) taggant, a variable image, an encrypted barcode, anti-tamper slits, a hologram, a magnetic ink, a conductive ink, a thermal ink, a hot stamping foil, or intentional misspellings.

In at least one example embodiment, the obtained sensor configuration information include sensor configuration settings related to at least one of a desired filtration setting, a desired fluorescence setting, a desired frequency response range, a desired absorption response range, a desired magnification setting, or a desired polarization setting.

At least one example embodiment relates to a non-transitory computer readable medium. In at least one example embodiment, the non-transitory computer readable medium includes computer readable instructions, which when executed by at least one processor, causes the at least one processor to receive a target image of a product to be authenticated, the product including at least one security feature, identify the product to be authenticated based on the target image and product information stored in a product database, obtain sensor configuration information for at least one sensor of a mobile device associated with the at least one security feature based on the identified product, examine the at least one security feature of the product with the at least one sensor based on the sensor configuration information using at least one sensor, and authenticate the product based on results from the examination.

In at least one example embodiment, the computer readable instructions cause the at least one processor to obtain the sensor configuration information by obtaining security feature type information of the at least one security feature and position information associated with an expected position of the at least one security feature using the product database and the identified product, and obtaining the sensor configuration information for the at least one sensor based on the obtained security feature type information.

In at least one example embodiment, the computer readable instructions cause the at least one processor to examine the at least one security feature of the product by displaying, on the at least one display panel, instructions indicating a relative examination position of the at least one optical sensor based on the position information of the at least one security feature, determining whether the at least one sensor is properly positioned relative to the at least one security feature based on the relative examination position, and analyzing the at least one security feature using the at least one optical sensor that is positioned at the relative examination position.

In at least one example embodiment, the security feature type information includes at least one of a security thread, a three-dimensional (3-D) security ribbon, a watermark, a color-shifting ink, a microprint, a spare out, an infra-red (IR) taggant, an ultra-violet (UV) taggant, a variable image, an encrypted barcode, anti-tamper slits, a hologram, a magnetic ink, a conductive ink, a thermal ink, a hot stamping foil, or intentional misspellings.

In at least one example embodiment, the obtained sensor configuration information include sensor related to at least one of a desired filtration setting, a desired fluorescence setting, a desired frequency response range, a desired absorption response range, a desired magnification setting, or a desired polarization setting.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 3 illustrates a hardware configuration of a server for authenticating security features of a product including multiple security features according to at least one example embodiment.

FIG. 4 illustrates an example of an item including a plurality of security features according to at least one example embodiment.

Figure 1:
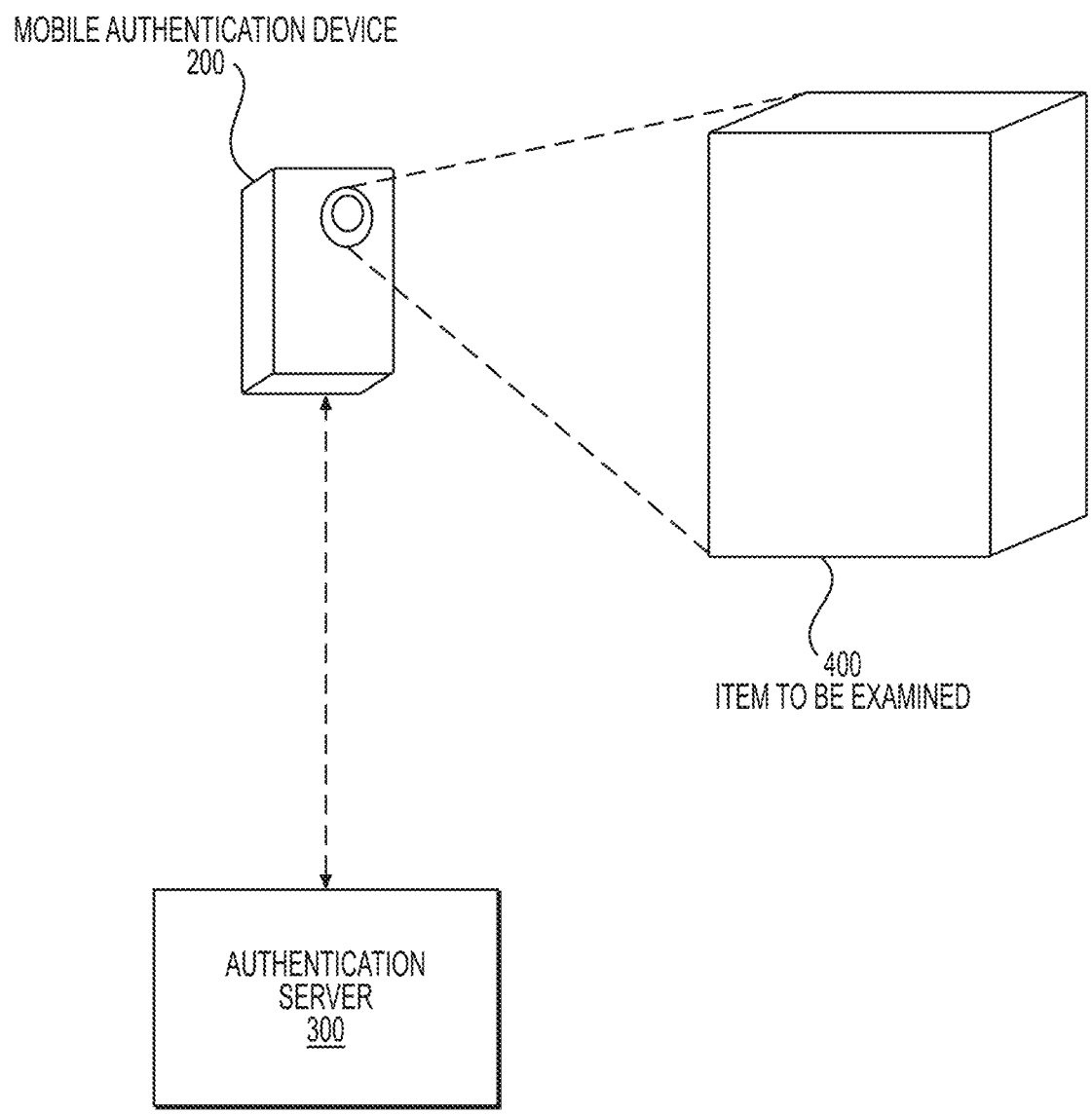
FIG. 1 illustrates a system for authenticating security features of a product including multiple security features according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, regions, layers, and/or sections, these elements, regions, layers, and/or sections, should not be limited by these terms. These terms are only used to distinguish one element, region, layer, or section, from another region, layer, or section. Thus, a first element, region, layer, or section, discussed below may be termed a second element, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, and/or elements, but do not preclude the presence or addition of one or more other features, integers, steps, operations, elements, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, element, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or elements such as the described system, architecture, devices, circuit, and the like, may be connected or combined to be different from the above-described methods, or results may be appropriately achieved by other elements or equivalents.

FIG. 1 illustrates a system for authenticating security features of a product including multiple security features according to at least one example embodiment.

The authentication system 100 includes at least one mobile authentication device 200 and at least one authentication server 300 for authenticating at least one product, object, and/or item 400. While a single mobile authentication device, authentication server, and product to be authenticated are illustrated in FIG. 1, the example embodiments are not limited thereto and there may be a greater or lesser number of each individual element in the system and/or other additional elements included in the system according to other example embodiments, such as additional mobile authentication devices, authentication servers, items to be authenticated, etc., and in other example embodiments, elements may be omitted, such as the authentication server, etc.

According to various example embodiments, the mobile authentication device 200 may be a mobile device configured to scan and authenticate different types of security features of a product, good, package, currency, document, and/or other item to be authenticated. For example, the mobile authentication device 200 is a handheld portable device that includes a plurality of image sensors (e.g., visible light image sensors, infra-red (IR) image sensors, ultraviolet (UV) image sensors, etc.), magnetic sensors, radio-frequency sensors, etc., to detect multiple classes (e.g., types) of security features that may be carried by customs officers, immigration officers, law enforcement, public officials, security personnel, brand holders, merchants, etc., to detect counterfeit goods, counterfeit papers, etc., and/or to determine whether a good, paper, etc., is genuine and/or authorized for sale. In other example embodiments, the mobile authentication device 200 may be a wearable device and/or a movable device. The mobile authentication device 200 will be discussed in further detail in connection with FIG. 2.

The mobile authentication device 200 may be used to authenticate an item to be authenticated 400 (e.g., a product, good, package, currency, document, etc.) that includes a plurality of different types of security features. For example, the item 400 may include security features such as a security thread, a three-dimensional security ribbon, a watermark, a color-shifting ink, a microprint, a spare out, an IR taggant, a UV taggant, a variable image, an encrypted barcode, anti-tamper slits, holograms, intentional misspellings, etc., that may be used to differentiate authentic items from counterfeit items (e.g., anti-counterfeit security measures, etc.), genuine items from non-genuine items, and/or authorized items from non-authorized items (e.g., smuggled items), etc. The security features may be printed, embedded, sealed, stamped, heat transferred, woven, applied via laser ablation, applied using a special coating material (e.g., a special coating that may be activated under a desired condition, such as under heat, cooling, light, sound, etc., to produce a change in the special coating, such as a pigment change, etc., and may allow for the reading of text characters, barcodes, etc.) and/or a change in the expected coating material used on the packaging, and/or otherwise applied to the authentic item. Various examples of the item 400 may include a passport, drivers licenses, identification cards, currency, banknotes, physical products, product packaging, shipping manifests, tax stamps, shipping container seals, and/or other items that may be counterfeited, smuggled, and/or require proof of authenticity.

Some example embodiments provide that the mobile authentication device 200 may communicate with at least one authentication server 300. The authentications server 300 may store a product database that includes product information, item information, rules associated with whether a product is authorized for a particular location and/or jurisdiction, etc., as well as associated security feature information, such as the number of security features, the types of security features, the locations of security features, security feature sensor configuration information associated with each of the security features, rules for authenticating the security features, etc., for authentic, genuine, and/or authorized products, goods, and/or items to be authenticated (e.g., item 400). After obtaining an identification of the item to be authenticated 400 from the mobile authentication device 200, the authentication server 300 may transmit the security feature information related to the specific (and/or desired) item 400 based on security feature information associated with the item 400 stored in the database, as well as security feature sensor configuration information to the mobile authentication device 200. In some example embodiments, the information stored on the authentication server 300 may be stored on the mobile authentication device 200 and the authentication server 300 may be omitted in part or entirely.

According to some example embodiments, the mobile authentication device 200 and the authentication server 300 are connected over a wired and/or wireless connection, such as a universal serial bus (USB) connection, a FireWire connection, a Serial Digital Interface (SDI) connection, an Ethernet connection, a Bluetooth connection, a WiFi connection, an infra-red (IR) connection, a Code Division Multiple Access (CDMA) connection, a Global System for Mobile Communications (GSM) connection, a 3G connection, a 4G connection, a 5G connection, an LTE connection, other cellular network connections, a satellite connection, etc., or combinations thereof. The authentication server 300 may be located in the same physical location and/or network as the mobile authentication device 200 (e.g., the same LAN network, same intranet network, same building, same shipping yard, same airport, a personal area network (PAN), a Bluetooth network, etc.), or may reside at a different physical location and/or different network. For example, the authentication server 300 may be a server and may reside on a cloud network, the Internet, a private network specific to the present authentication system, a cellular network, etc. Additionally, according to some example embodiments, the connection between the authentication server 300 and the mobile authentication device 200 is a secure connection (e.g., an encrypted communication connection, etc.) requiring network authentication of the mobile authentication device 200 prior to and/or during a communication session. Connection to the authentication server 300 may be limited to a desired set (or subset) of mobile authentication devices based on a unique identifier associated with each mobile authentication device so that confidential and/or proprietary information related to the security features of various products, goods, packages, currencies, documents, etc. are kept secure. Additional security may be obtained through the authentication of operators of the mobile authentication device 200, such as biometric authentication (e.g., fingerprint authentication, voice authentication, iris authentication, facial image recognition, etc.), security devices (e.g., specialized devices that generate RSA token pairs, individually issued keycards, etc.), username/password combinations, PIN codes, pattern recognition, etc., may be integrated into the mobile authentication device 200 so that the operator may be authenticated prior to use of the mobile authentication device 200 and/or prior to connection to the authentication server 300.

Figure 2:
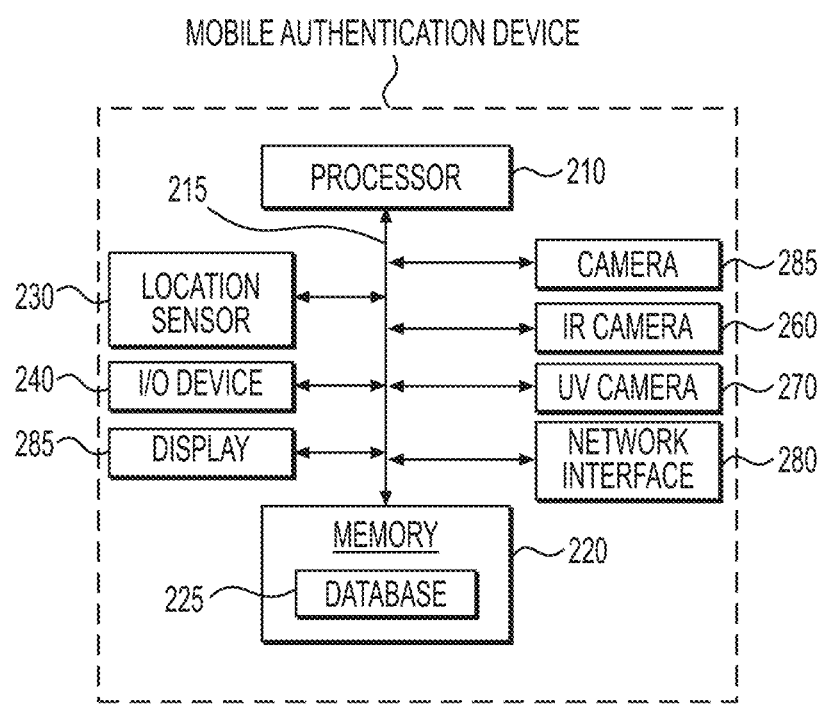
FIG. 2 illustrates a hardware configuration of a mobile device for authenticating security features of a product including multiple security features according to at least one example embodiment.

FIG. 2 illustrates a hardware configuration of a mobile device for authenticating security features of a product including multiple security features according to at least one example embodiment. The mobile authentication device 200 may include at least one processor 210, a communication bus 215, and a memory 220. The memory 220 may include a product database 225, etc. The mobile authentication device 200 may also include a location sensor 230, input/output (I/O) devices 240, a plurality of security feature detection sensors, such as a visible light camera 250, an IR camera 260, a UV camera 270, a magnetic sensor (not shown), a RFID sensor (not shown), a microdot sensor (not shown), etc., a network interface 280, and a display 285, but is not limited thereto.

In at least one example embodiment, the processor 210 may be at least one processor (and/or processor cores, distributed processors, networked processors, etc.), which may be configured to control one or more elements of the mobile authentication device 200. The processor 210 is configured to execute processes by retrieving program code (e.g., computer readable instructions) and data from the memory 220 to process them, thereby executing control and functions of the entire mobile authentication device 200. Once the program instructions are loaded into the processor 210, the processor 210 executes the program instructions, thereby transforming the processor 210 into a special purpose processor.

In at least one example embodiment, the memory 220 may be a non-transitory computer-readable storage medium and may include a random access memory (RAM), a read only memory (ROM), and/or a permanent mass storage device such as a disk drive, or a solid state drive. Stored in the memory 220 is program code (i.e., computer readable instructions) for the product database 225, as well as program code related to configuring the plurality of security feature detection sensors, etc. Additionally, the memory 220 may store additional data (not shown) for use with the stored program code, such as mobile authentication device operator profile data, network security information, encryption protocols, authentication protocols, etc. Such software elements may be loaded from a non-transitory computer-readable storage medium independent of the memory 220, using a drive mechanism (not shown) connected to the mobile authentication device 200. In other example embodiments, software elements may be loaded onto the memory 220 through the network interface 280 via a wired and/or wireless communication protocol, such as Ethernet, USB, FireWire, eSATA, ExpressCard, Thunderbolt, Wi-Fi, Bluetooth, Near-Field Communications (NFC), Infra-Red (IR) communications, RFID communications, 3G, 4G LTE, etc.

In at least one example embodiment, the communication bus 215 may enable communication and data transmission to be performed between elements of the mobile authentication device 200. The bus 215 may be implemented using a high-speed serial bus, a parallel bus, and/or any other appropriate communication technology.

The mobile authentication device 200 may also include a network interface 280. The network interface 280 may be a wireless transmitter and/or a wired communication interface and may enable the processor 210 to communicate with and/or transfer data to/from the authentication server 300, other mobile authentication devices, and/or other computing devices (not shown). In at least one example embodiment, the network interface 280 may be a computer hardware element for connecting the mobile authentication device 200 to one or more computer networks (e.g., the Internet, an Intranet, a Wide Area Network (WAN), a Local Area Network (LAN), a Personal Area Network (PAN), a Cellular Communication Network, a Data Network, etc.) and/or one or more external computing devices (e.g., a PC, a server, a database, a laptop computer, a smartphone, a tablet, other smart devices, an Internet-of-Things (IOT) device, a gaming console, a Personal Digital Assistant (PDA), etc.).

The mobile authentication device 200 may also include various input/output (I/O) devices 240, such as a keyboard, mouse, touch panel, stylus, microphone, cameras, speakers, haptic feedback devices, etc., which allow an operator to input information and/or data into a Graphical User Interface (GUI) of the mobile authentication device 200, and to receive information from the mobile authentication device 200. Additionally, various sensors, such as a location sensor 230, such as geolocation sensors and/or relative position sensors (e.g., gyroscopes, accelerometers, GPS sensors, other position and location sensors, altitude sensors, pressure sensors, etc.), may be included in the mobile authentication device 200 to provide location information to the mobile authentication device 200. For example, the location information of the mobile authentication device 200 may be used during the authentication process of an item 400 to determine whether the item is authorized to be imported into and/or exported from a specified country, location, jurisdiction, and/or region, and may also be used to determine the location-specific security features that are required to be present in an item 400 that is being shipped, transferred, bought or sold, and/or otherwise entering the stream of commerce. Additionally, the location information of the mobile authentication device 200 may include relative position information, or in other words, information regarding the position of the mobile authentication device 200 in relation to an object and/or landmark, such as the item 400.

As another example, the location information of the mobile authentication device 200 may also be used to reduce and/or prevent the unauthorized use and/or access of the mobile authentication device 200 in geographic locations where the mobile authentication device 200 is not authorized to function. For example, the authentication server 300 may be configured to only communicate with the mobile authentication device 200 when the mobile authentication device 200 is within an authorized geographic location and/or geographic region (e.g., a geo-fence). When the location information indicates that the mobile authentication device 200 is within the authorized geo-fence area (e.g., a city, a country, a state, a locality, a region, a facility, a building, a defined area, etc.), the authentication server 300 may allow communication between the mobile authentication device 200 and the authentication server 300 and/or may allow the mobile authentication device 200 to perform the authentication method described below.

Additionally, the mobile authentication device 200 may also include a display 285 to provide the GUI to the operator of the mobile authentication device 200. For example, the display 285 may be an LED display, a LCD display, a touch panel, a projector, etc., that may provide information related to the authentication of the item 400 to the operator. Additionally, the display 285 may provide instructions to the operator regarding proper inspection protocol of the item 400 (e.g., general areas of the item 400 to scan with the security feature detection sensors of the mobile authentication device 200, the distance away from the item 400 that the security feature detection sensors of the mobile authentication device 200 should be from the item 400, etc.), as well as the results of the inspection and/or authentication of the item 400.

In at least one example embodiment, the mobile authentication device 200 may also include one or more security devices (not shown), such as a fingerprint sensor, iris scanner, security card readers, etc., configured to perform security authentication of an operator of the mobile authentication device 200.

While FIG. 2 depicts an example embodiment of a mobile authentication device 200, the mobile authentication device is not limited thereto, and may include additional and/or alternative architectures that may be suitable for the purposes demonstrated. For example, the mobile authentication device 200 may include a plurality of additional or alternative elements, such as additional processing devices, sensors, interfaces, and memories.

FIG. 3 illustrates a hardware configuration of an authentication server for authenticating security features of a product including multiple security features according to at least one example embodiment. Description of components in the authentication server 300 which are the same as components described in connection with FIG. 2 will be partially or completely omitted and the same components may be assumed to have the same and/or similar characteristics and/or operation as the components described in connection with FIG. 2. Differences between the mobile authentication device 200 and the authentication server 300 will be described below.

According to at least one example embodiment, the authentication server 300 may include at least one processor 310, a communication bus 315, a memory 320, a network interface 330, and/or I/O devices (not shown), but is not limited thereto. The memory 320 may include a product database 321 and/or a secure website interface 322 (e.g., a secure communication portal), etc., but is not limited thereto. The product database 321 may store product information related to a plurality of items to be stored (e.g., passport, drivers licenses, identification cards, currency, banknotes, physical products, product packaging, shipping manifests, tax stamps, shipping container seals, and/or other items), security feature information for each of the items, product tracking information (e.g., the physical locations that a particular item 400 has been examined by the authentication system 100, the date and/or time that the item 400 was examined, and product identification information of the item 400, such as the serial number of the item 400, a UPC code, and/or other unique identifying information, etc.) related to individual items that have been examined, etc. For example, the product information related to the plurality of items may include product identification information such as images, data, etc., of distinguishing and/or identifying features of the product, such as images and/or data related to the product packaging, logos associated with various versions of the product, product specific slogans, graphical designs associated with the product, valid UPC codes, information related to country and/or region specific products and/or packaging, holiday specific products and/or packaging, special promotion related products and/or packaging, serial numbers associated with a version/printing/pressing/release/ etc., intellectual property rights (e.g., trademarks, copyrights, patents, etc.) associated with various versions of the product, product provider information, such as corporate/ brandholder/intellectual property rights holder contact information associated with the product, location specific formulations, flavors, and/or ingredient lists, used in a product, etc., and/or other identifying codes associated with the product, etc. Additionally, the product identification information may include information regarding the layout designs of various versions of the product and/or product packaging for facilitating the identification of the product or the version of the product that is being examined by the operator of the mobile authentication device 200. The product information stored in the product database 321 may also include product authentication rules for determining whether the product being examined is authorized for the location where the examination is occurring, such as the dates and/or locations that certain versions of the product and/or product packaging were authorized to be released, e.g., country and/or region specific products and/or packaging, holiday specific products and/or packaging, special promotion related products and/or packaging, serial numbers, logos, graphical designs associated with the product, etc. The product authentication rules may be used to determine whether an item being examined is authorized for use, sale, import, export, etc., at a desired time and/or location. In other words, the product authentication rules may also include geographical and/or temporal restriction information related to various versions of an item, product, packaging, etc. In other words, the product authentication rules indicate whether the product type and/or version is authorized for sale based on geographic, temporal, and/or other considerations (e.g., determine whether an otherwise authentic product is authorized for sale in the country that it is being imported into, i.e., gray-market product sales; determine whether the authentic product is authorized for sale within a desired time period, i.e., the product is not being sold before it is authorized for sale, etc.; determine whether an authentic security feature has been placed on a counterfeit product, smuggled product, etc.).

Additionally, in some example embodiments, the product database 321 may also include security feature information related to each item to be examined 400. The security feature information may include information regarding the types of security features located on the item (which will be discussed in further detail in connection with FIG. 4), the locations of the security features of the item based on the version of the item and/or item packaging, the number of security features, authentication rules associated with the security features, and/or examination instruction information associated with the security features, etc. For example, the security feature information may include information such as the fact that a 2016 Christmas holiday version of a product package includes a microprint on the top of the product packaging, a UV watermark pattern on the bottom left corner of the packaging, and color shift ink on the logo of the product packaging. Additionally, the security feature information may also include information such as the location of various physical anti-theft, anti-counterfeit measures, and/or anti-smuggling measures, such as RFID tags, etc., and authentic and/or genuine responses expected from the anti-theft/anti-counterfeit/anti-smuggling measures.

The security feature information stored in the product database 321 may also include configuration information (e.g., security feature sensor configuration information, hardware configuration information, sensor configuration information, sensor settings, etc.) related to the security feature detection sensors of the mobile authentication device 200 associated with the item 400 being inspected. For example, the product database 321 may include sensor configuration information which, when transmitted to the mobile authentication device 200, configures the frequencies of one or more of the visible light camera 250, the IR camera 260, the UV camera 270, the RFID sensor, other security feature sensors, etc., without manual input and/or intervention by the operator of the mobile authentication device 200. In other words, the authentication server 300 may, based on product information of an item 400 being examined by the operator of the mobile authentication device 200, transmit sensor configuration information to the mobile authentication device 200 that allows the sensors of the mobile authentication device 200 to scan (and/or automatically scan) the item 400 for all of the security features expected on the item, without requiring the human operator to manually configure the sensors (e.g., automatically configure the sensors) of the mobile authentication device 200. Additionally, according to some example embodiments, the operator of the mobile authentication device 200 may be a non-human operator, for example, a robotic and/or other autonomous operator, that is capable of moving the mobile authentication device 200 into the appropriate positions relative to the item 400 being inspected in response to instructions (e.g., computer readable instructions) provided by the mobile authentication device 200.

For example, once the security feature detection sensors of the mobile authentication device 200 have been configured to examine the item 400 being inspected, the mobile authentication device 200 may select one or more desired settings associated with the one or more security feature detection sensors (e.g., selecting a desired frequency range of a UV camera, an IR camera, etc.; selecting a flash setting associated with the optical camera to use to heat thermal ink, etc.; selecting a desired polarization setting; selecting a desired color range; selecting an OCR mode and/or image recognition mode for an optical camera; selecting an RF frequency for a RFID tag, a NFC tag, a Bluetooth LE tag, etc.) based on the sensor configuration information. Additionally, the one or more security feature detection sensors may be configured, based on the sensor configuration information and/or security feature authentication rules, to analyze for and/or expect a desired response (e.g., a fluorescence response within a desired range, a specific UV frequency response within a desired range, a specific IR frequency response within a desired range, a desired absorption response within a desired range, a desired amount of polarization, recognizing an intentional misspelling using OCR, detecting a security thread, detecting a correct color-shift in color-shift ink, correctly decrypting an encrypted barcode (e.g., an encrypted visible light spectrum barcode, an encrypted IR barcode, an encrypted UV barcode, etc.) receiving a correct response from a RFID tag, etc.) that indicates that the particular security feature is present in the item 400.

Further, by automatically configuring the sensors of the mobile authentication device 200 without the input of the operator, the sensor configuration information (e.g., frequency information, response expected information, etc.) and other security feature information (e.g., location of security features, number of security features, types of security features, etc.) of the mobile authentication device 200 may be kept confidential and/or private from the operator as well, thus ensuring complete privacy for governments, product providers (e.g., brandholders, intellectual property rights holders, etc.), security feature manufacturers, etc., from counterfeiters, smugglers, competitors, etc. However, the example embodiments are not limited thereto, and the configuration of the sensors of the mobile authentication device 200 and/or scanning of the item being examined may include operator input. Moreover, in at least one example embodiment, the contents of the product database 321 may be encrypted to increase the confidentiality and/or privacy of the confidential and/or proprietary security information. According to some example embodiments, some or all of the product database 321 may also be stored in the memory 220 of the mobile authentication device 200. In particular, when the product database 321 is stored on the mobile authentication device 200, the product database 321 may act as a cache of previously downloaded sensor configuration information, product information, and security feature information from the authentication server 300. Additionally, according to some example embodiments, the authentication server 300 may transmit product database updates including new and/or updated product information to the mobile authentication device 200 on request, intermittently, and/or on a periodic basis. The product database 321 and/or the cache may be stored in an encrypted format using well known encryption technologies in order to prevent unauthorized access to the product information (e.g., product authentication rules, information related to facilitating identification of the product, etc.), security feature information (e.g., the sensor configuration information, the types of security features located on the item, the number of security features located on the item, the locations of the security features on the item, etc.), and the product tracking information.

Additionally, according to some example embodiments, the memory 320 may also include a secure website (e.g., a secure communication portal, etc.) 322. The secure website 322 is a website or other communication portal that allows governments, product providers (e.g., brandholders, intellectual property rights holders, etc.), security feature manufacturers, etc., to upload product information, security feature information, tracking information, etc., to the product database 321. The secure website 322 may include computer security features, such as username/password requirements, hardware based token requirements, public-private key encrypted communication protocols, etc., to ensure that access to the secure website 322 is limited to authorized parties and that communication between the authorized party and the authentication server 300 is secure. Moreover, according to at least one example embodiment, an operator of a mobile authentication device 200 may also login to the secure website 322 to update tracking information related to an item being examined 400, as well as to request that the authentication server 300 push sensor configuration information to the mobile authentication device 200 that is being operated by the operator. The secure website 322 will be discussed in greater detail in connection with FIG. 6.

While FIG. 3 depicts an example embodiment of an authentication server 300, the authentication server 300 is not limited thereto, and may include additional and/or alternative architectures that may be suitable for the purposes demonstrated. For example, the authentication server 300 may include a plurality of additional or alternative elements, such as additional processing devices, interfaces, and memories. Additionally, the authentication server 300 may be a distributed and/or cloud computing system and may comprise a plurality of interconnected servers configured to server a plurality of mobile authentication devices 200.

FIG. 4 illustrates an example of an item including a plurality of security features according to at least one example embodiment. In various example embodiments, the item (and/or packaging) to be examined 400 may include a product logo, graphical designs, trademarks, service marks, UPCs, serial numbers, other identifying marks of the product and/or item. Additionally, the item 400 also includes a plurality of security features, such as one or more security threads, 3D security ribbons, watermarks, color shifting ink, microprint, spare out, IR taggants, UV taggants, variable images, encrypted barcodes, anti-tamper slits, holograms, intentional misspellings, RFID tags, etc. These security features may be placed in various desired (and/or predetermined) locations on the item 400. Further, the security features, product logos, graphical designs, trademarks, service marks, UPCs, serial numbers, etc., may be specific to a version of the item 400 based on the location that the item is authorized to be released in and/or time of manufacture, printing, etc.

For example, the US Treasury periodically releases different versions of various denominations of US currency, such as the $100 bill. Each version of the $100 bill may have different sets of security features located on the bill, such as color shifting ink, security threads, holograms, etc., and the security features may be located on different locations of the bill, use different types of fonts, have different sizes, different versions of the Ben Franklin portrait, different signatures, different serial number ranges, etc., that differentiate the various versions of the $100 bill from each other and may be unique to that specific version of the $100 bill. Additionally, each version of the $100 bill may be graphically designed so that they do not resemble previous $100 bill graphical designs. Accordingly, these security features may be scanned for using the mobile authentication device 200 so that the item 400 may be authenticated as genuine and/or authorized.

As another example, certain goods may be affixed with government seals, tax stamps, inspection labels, genuine product seals, product safety seals, etc., that indicate that the item has passed inspection by a government official, has had taxes paid on the good, is a genuine article, is authorized for import/export, has not been previously opened, has not been tampered with, etc. These seals may be counterfeited, removed from properly inspected goods and reapplied to counterfeit goods, smuggled goods, and/or unauthorized goods, and/or removed altogether from the good by counterfeiters, smugglers, gray market importers, etc. Knowledge of the specific security features located on the government seal, tax stamp, inspection label, etc., as well as product specific/good specific information allows for the rapid and efficient inspection of these goods by government officials, customs officials, inspectors, law enforcement, etc., using the mobile authentication device 200, as well as tracking of individual goods, etc., using the product database 321. For example, if a tax stamp indicating that the proper state tax has been paid for a product that is authorized to be sold in that specific state, has been removed from a consumed product and then illegally affixed onto a new product on which the state tax has not been paid, the inspection of the security features of the tax stamp alone is unlikely to determine that the product is unauthorized for sale in that state. However, if the product is examined using the mobile authentication device 200, the probability of determining that the product is unauthorized is increased based on knowledge of the security features of the tax stamp as well as the knowledge of the security features of the product being examined (e.g., the product may have a serial number and/or other security features that indicates that it was intended to be sold in a different state/region/country, the tax stamp may have been affixed in an improper location of the product packaging, the product is a 2016 version of the product but the tax stamp is a 2014 version, etc.). Additional benefits are provided by the mobile authentication device 200 and the product database 321 because they allow the inspection official to use a single device to inspect the plurality of security features that may be present on a plurality of items to be examined. Further, due to the automatic configuration of the mobile authentication device 200, the inspection official is not required to memorize every possible combination of security features that may be present in various items and/or different versions of the same item being inspected by the official. This benefit reduces the continuous training costs of such operators, and also may increase the quality of inspections of items by such operators.

Figure 5:
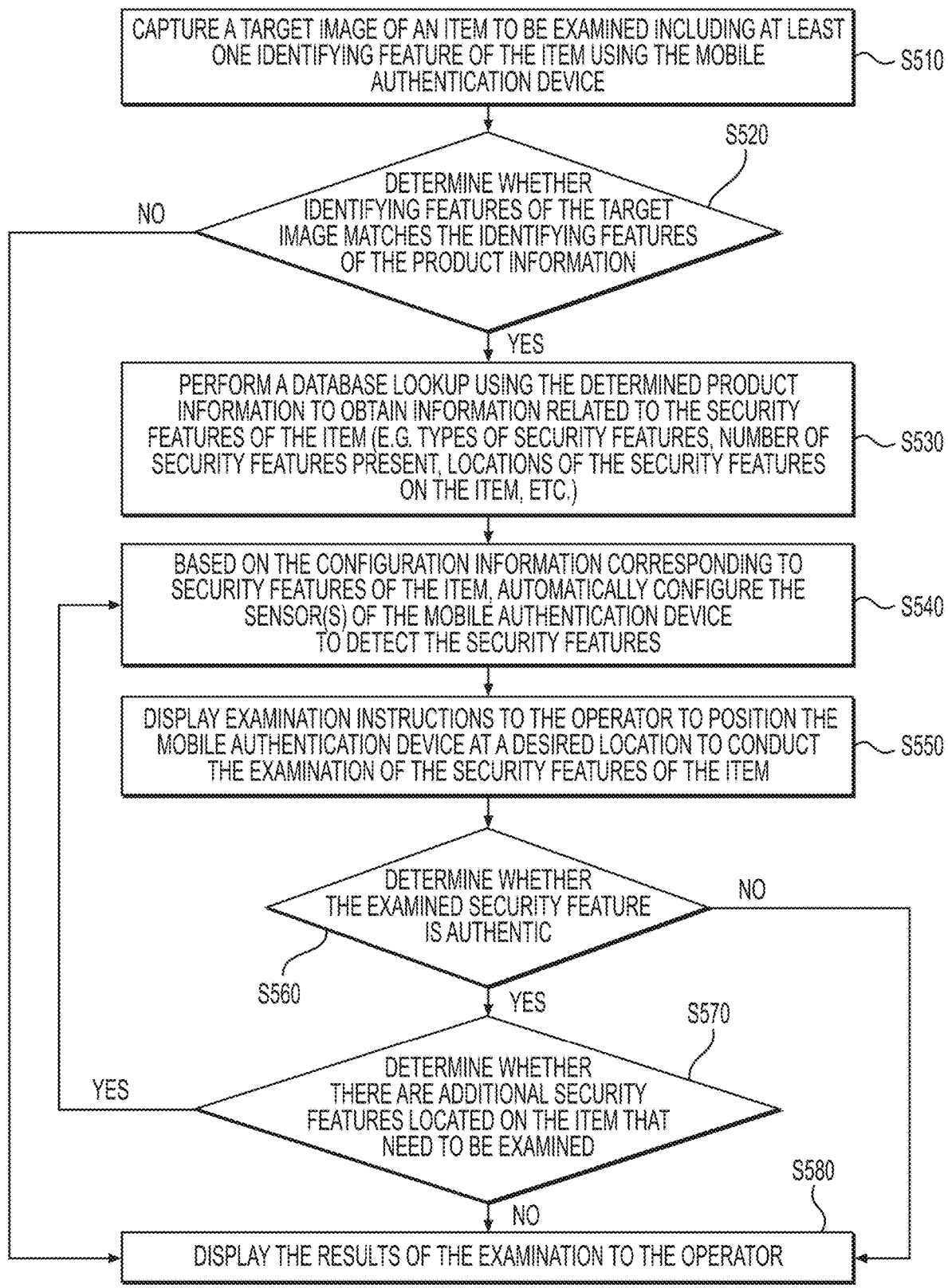
FIG. 5 depicts an example flowchart diagram illustrating a method for authenticating security features of a product including multiple security features according to at least one example embodiment.

FIG. 5 illustrates a flowchart diagram illustrating a method for authenticating security features of a product including multiple security features according to at least one example embodiment. According to some example embodiments, in operation S510, an operator of the mobile authentication device 200 may receive and/or capture a target image of an item to be examined using the visible light camera 250 (or other image capture source). The target image includes one or more identifying features of the item being examined, such as a serial number, UPC barcode, QR code, product logo, identifying graphical design, trademark, service mark, etc. In operation S520, the mobile authentication device 200 analyzes the target image to determine (e.g., identify, etc.) the type of item and/or version of the item that is being examined. The mobile authentication device 200 may analyze the target image based on product information (e.g., product authentication rules) stored on local database 225, or the target image may be transmitted by the mobile authentication device 200 to the authentication server 300 to be analyzed by the authentication server 300 and/or the mobile authentication device 200 in conjunction with the product database 321. The product information stored on the local database 225 and/or the product database 321 includes product identification information (e.g., information identifying distinguishing and/or identifying features of the product), product version information (e.g., information associated with the various versions of the product, etc.), product providers (e.g., corporate/brandholder/intellectual property rights holder, etc.) contact information, product authentication rules that provide an authoritative list of the identifying features present in various items, types of items, and/or versions of times, etc. The product information may be provided by the product provider, government entity, security feature provider, and/or other authorized legal rights holder of the product. The mobile authentication device 200 and/or the authentication server 300 may compare one or more of the identifying features of the item present in the target image, such as the serial number, UPC barcode, QR code, product logo, identifying graphical design, trademark, service mark, etc., using optical character recognition (OCR), image recognition, barcode reading, QR scanning, and/or other well-known techniques, with one or more of the identifying features in image and/or data format associated with product information stored on the local database 225 and/or the product database 321 to determine the identity of the item (e.g., type of item) and/or the version of the item that is being examined. In other words, the mobile authentication device 200 and/or the authentication server 300 may identify the item being examined based on one or more of the identifying features of the target image of the item and one or more of the identifying features of the stored product information.

If a desired number (e.g., a threshold number of identifying features, some required identifying features, all of the identifying features, etc.) of the identifying features of the target image are determined to match identifying features of product information stored in the local database 225 and/or product database 321 (and/or is otherwise identified as a product that is stored in the local database 225 and/or product database 321), the method proceeds to S530. If a desired number of the identifying features of the target image do not correspond to identifying features of the product information stored in the local database 225 and/or product database 321, the method proceeds to S590 where the result of the examination is displayed to the operator. For example, the results may indicate that the target image does not correspond to a product stored in the local database 225 and/or product database 321, that the image may need to be re-captured and the operations S510 and S520 need to performed again, and/or that the product is not genuine, etc.

In operation S530, the mobile authentication device 200 may perform a database lookup using the determined product information to obtain security feature information corresponding to the item identified in operation S520. The mobile authentication device 200 obtains (e.g., receives) the security feature information of the identified item. The security feature information includes the identity of security features (e.g., security feature type information) located on the item being examined, sensor configuration information related to the security features located on the item, number of security features located on the item, location of security features on the item, security feature authentication rules, examination instruction information related to the security features located on the item, etc. Additionally, product tracking information related to the item being examined may also be obtained and/or updated from the local database 225 and/or the product database 321. The product tracking information includes product source information (e.g., the place of manufacture, origination, etc.), product destination information, carrier shipping information (e.g., transportation vehicle identification information, transportation type information, etc.), transportation contract information, bill of lading information, shipping route information (e.g., geo-location information related to the shipping route for the product, etc.), product inspection information (e.g., information indicating date/time/location of inspections of the product, such as customs inspections, agricultural inspections, commercial inspections, identity of inspection officials, notes regarding the results of the inspection, etc.), etc. According to some example embodiments, if the security feature information is not stored on the local database 225, the mobile authentication device 200 transmits a request to the product database 321 of the authentication server 300 over a secure wired and/or wireless connection for the security feature information corresponding to the identified item. Additionally, according to some example embodiments, the authentication server 300 may then transmit the requested security feature information to the mobile authentication device 200 for caching in the local database 225.

In operation S540, once the security feature information has been obtained, the mobile authentication device 200 configures the security feature detection sensor(s) of the mobile authentication device 200 based on the sensor configuration information included in the obtained security feature information obtained (e.g., received) from the local database 225 and/or the product database 321. In other words, the mobile authentication device 200 uses sensor configuration information corresponding to the security features of the item being examined to configure and/or automatically configure the one or more of the sensors of the mobile authentication device 200. For example, if the security feature information related to the identified item to be examined indicates that the item includes a UV watermark that fluoresces at a desired frequency X, magnetic ink included in the bottom panel of the product packaging, and a microdot located in the logo printed on the product packaging. The sensor configuration information may indicate a frequency for a sensor to emit an electro-magnetic signal, settings for the magnetic sensor, settings for a microdot sensor (e.g., an optical camera) to detect the microdot, etc. Accordingly, the mobile authentication device 200 may use the sensor configuration information to configure the UV camera of the mobile authentication device 200 to operate at the desired frequency X (or a frequency range including the desired frequency X, etc.), configure the magnetic sensor for operation, and configure the microdot sensor for operation, etc.

Further, in operation S560, according to some example embodiments, the mobile authentication device 200 displays and/or otherwise presents (e.g., by providing verbal instructions, haptic feedback, etc.) the examination instructions in the examination instruction information of the security feature information of the item being examined to the operator of the mobile authentication device. For example, the mobile authentication device 200 may instruct the operator to place the mobile authentication device 200 at a desired relative examination position with respect to (e.g., relative to) the item being examined, such as a desired distance, desired position, desired orientation, desired angle, etc., from a particular feature of the item. As an example, the operator may be instructed to place the mobile authentication device 200 five inches in front of the front face of a rectangular prism-shaped item at a 90 degree angle. As another example, the operator may be instructed to position the mobile authentication device 200 over a specific position of the item (e.g., a corner of the front face of the item, the center of the front face of the item, etc.), or to slowly move the mobile authentication device 200 over an entire face of the item being examined, around a curve of the item being examined, or the entire item itself, etc. The examination instructions may be displayed using the display 285 of the mobile authentication device 200 and/or the examination instructions may be transmitted directly to the operator of the mobile authentication device 200, for example, via speakers to a human operator, via virtual reality and/or augmented reality outputs, etc. Additionally, in the event that the examination is being performed by a non-human operator (e.g., automatic examination), the examination instructions may be transmitted via computer readable instructions to the non-human operator, and may cause the non-human operator (e.g., automated examination computer, automated examination device, robot, etc.) to perform the examination of the item.

In operation S560, the mobile authentication device 200 may determine that the mobile authentication device 200 has been placed at a desired relative examination position indicated by the examination instruction information with respect to the item being examined for the one or more security features whose examination instructions are displayed and/or presented to the operator of the mobile authentication device based on the location sensors 230 of the mobile authentication device 200. For example, the mobile authentication device 200 may use sensors, such as gyroscopes, accelerometers, a laser range finder, echo-location sensors, etc., to detect the distance, orientation, angle, etc., of the mobile authentication device 200 in relation to the item to determine whether the mobile authentication device 200 is placed in the desired relative examination position. As another example, the mobile authentication device 200 may use security feature detection sensors, such as the visible light camera 250, and/or other cameras, to detect the comparative size, angle, orientation, etc., and/or to detect an identifying feature of the item in an image output by the camera; and/or other sensors may be used, such as an RF sensor, to detect if the desired security feature of the item is within range of the sensor, etc., and thereby the mobile authentication device 200 may determine whether the mobile authentication device 200 has been placed at the desired relative examination position for the examining the one or more security feature of the item being examined.

Once the mobile authentication device 200 is placed in the proper relative examination position(s) corresponding to the examination instructions provided to the operator, the previously configured security feature detection sensors of the mobile authentication device 200 examine (and/or automatically examine) the item for one or more desired security features located in the area of the item indicated in the examination instruction information using the security feature authentication rules included in the security feature information to determine if the response detected by the security feature detection sensors indicate that the security feature is authentic and correctly placed on the item being examined. For example, if only a single security feature is present on the item being examined, when the desired area of the item (or the entire item) has been examined by the mobile authentication device 200 in accordance with the examination instruction information, the mobile authentication device 200 determines whether the item is authentic, genuine, and/or authorized, by determining whether the correct security feature was present at the correct location on the item being examined and that the security feature provided the desired response to the test stimuli provided by the security feature sensor (e.g., a fluorescence response within a desired range, a specific UV frequency response within a desired range, a specific IR frequency response within a desired range, a desired absorption response within a desired range, a desired amount of polarization, recognizing an intentional misspelling using OCR, detecting a security thread, detecting a correct color-shift in color-shift ink, correctly decrypting an encrypted barcode (e.g., an encrypted visible light spectrum barcode, an encrypted IR barcode, an encrypted UV barcode, etc.) receiving a correct response from a RFID tag, etc.) that indicates that the particular security feature is present in the item 400. The mobile authentication device 200 determines whether the correct security feature was present at the correct location on the item being examined based on the product information and the security feature information stored in the local database 225 and/or the product database 321, and the examination results of the security feature generated by the security feature detection sensor.

According to some example embodiments, more than one security feature may be examined at a single time based on the number of separate security features being examined, the types of security features being examined, and/or the security feature sensors installed on the mobile authentication device 200. For example, if the item being examined includes an intentional misspelling which can be examined using an optical camera, an IR taggant (e.g., infrared emitting dyes, paints, coatings, fillers, fibers, buttons, quantum dots, etc., which may be embedded and/or applied to a product and/or packaging and may emit coded optical signals in the infrared spectrum through chemiluminescence, photoluminescence, and/or electroluminescence processes, etc.) which can be examined using a calibrated IR camera, and magnetic ink which can be examined by a magnetic sensor, and all three security features are capable of being examined by the mobile authentication device from the same and/or similar relative position, the mobile authentication device will provide examination instructions to the operator instructing the operator to place the mobile authentication device in the desired relative examination position and the mobile authentication device will determine whether the plurality of security features are authentic in one pass.

However, according to other example embodiments, the security features of the item being examined may be authenticated in two or more passes based on the number of security features being examined, the types of security features being examined, and the security feature sensors installed on the mobile authentication device 200, as shown in operation S570. Additionally, if the mobile authentication device 200 determines that any of the examined security features are incorrect and/or missing based on the results of the examination of the security feature(s) at the examination position(s), the mobile authentication device 200 determines that the item is not authentic, not genuine, and/or not authorized. The method then proceeds to operation S590 and displays the results of the examination to the operator.

As discussed above, in operation S570, the mobile authentication device 200 may determine whether there are additional security features located on the item that is being examined. If there are additional security features requiring examination, the operator may then be instructed to reposition the mobile authentication device 200 such that the next security feature may be examined and continue examination of the item as illustrated in operations S540 to S560. In some example embodiments, the mobile authentication device 200 may examine the plurality of security features located on the item in sequential examination passes, with the mobile authentication device 200 re-configuring the security feature sensors on each pass based on the security features that will be examined on that pass. In other example embodiments, the mobile authentication device 200 may examine all security features located on the item in a single pass, with every security feature sensor being configured prior to the single pass. If there are no additional security features located on the item that is being examined and all of the examined security features are correct, the mobile authentication device 200 determines that the item being examined is authentic, genuine, and/or authorized based on the examination results of all of the examination passes performed by the mobile authentication device 200.

For example, the mobile authentication device 200 may identify an item that is being examined is associated with a particular product version, e.g., Product version 1.0.A. The mobile authentication device 200 then obtains security feature information related to Product version 1.0.A, such as information indicating that the item includes a first UV watermark that fluoresces at a desired frequency X at a first examination position, and a second UV watermark that fluoresces at a desired frequency Y at a second examination position. The security feature information related to Product version 1.0.A also includes sensor configuration information related to the first UV watermark and the second UV watermark, and the mobile authentication device 200 configures the UV camera 270 using first sensor configuration information related to the first UV watermark to determine if an authentic first UV watermark is present at the first examination position. If the mobile authentication device 200 determines that the examined security features is correct and/or authentic based on the results of the examination of the security feature(s) at the examination position, the method then proceeds to operation S570 and the mobile authentication device 200 determines that the second UV watermark needs to be examined. The method then proceeds back to operation S540 to S560, and the mobile authentication device 200 configures the UV camera 270 using second sensor configuration information related to the second UV watermark, displays examination instructions to the operator indicating that the mobile authentication device 200 needs to be positioned at the second examination position, and the second UV watermark is then authenticated.

Once every security feature of the item has been examined, in operation S580, the mobile authentication device 200 outputs the results of the examination to the operator on a GUI via the display 285 (and/or via a speaker, directly to the non-human operator, etc.). Additionally, the mobile authentication device 200 may transmit the examination results to the authentication server 300 so that the product database 321 is updated with the examination results, and appropriate officials may be contacted as well (e.g., law enforcement, product providers, etc.) based on the contact information stored in the local database 225 and/or the product database 321. Moreover, the product tracking information associated with the item being examined stored in the product database 321 may be updated with the current location of the item (e.g., the inspection location), so that the transportation history, importation history, inspection history, etc., of the item may be documented for other purposes (e.g., sales/marketing trend information, logistical planning purposes, etc.).

Figure 6:
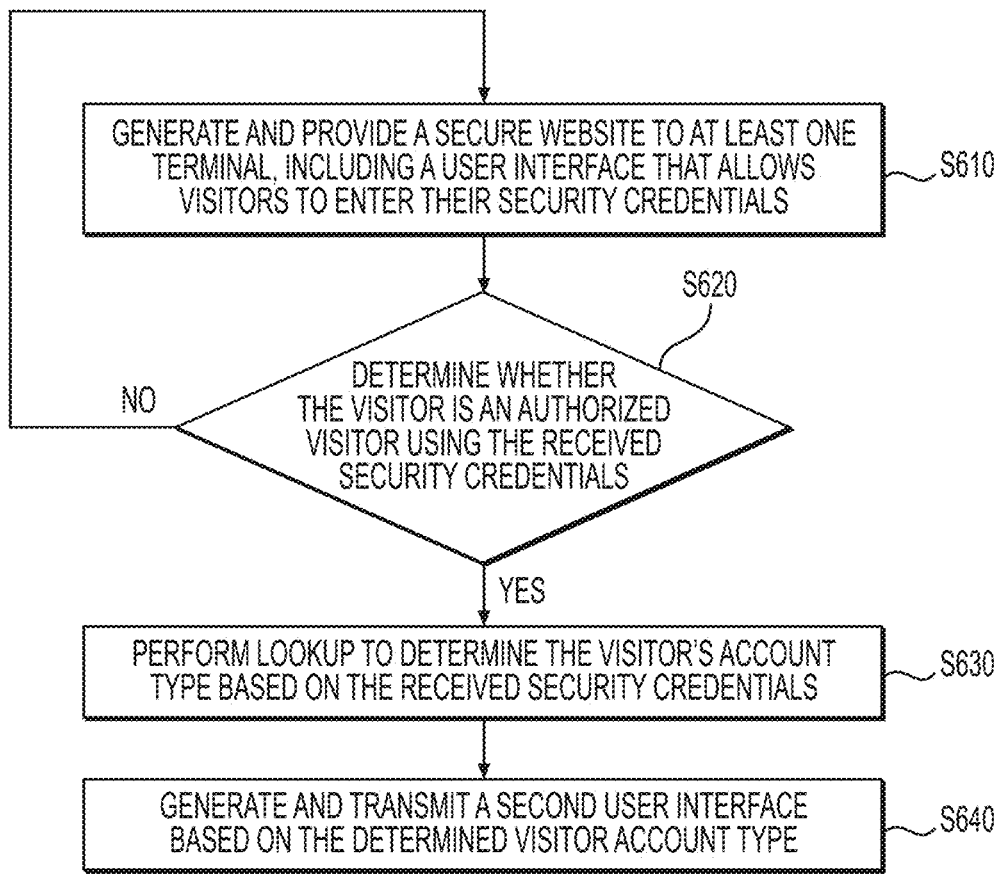
FIG. 6 depicts an example flowchart diagram illustrating a method for updating a product database using a secure website according to at least one example embodiment.

FIG. 6 is a flowchart diagram illustrating a method for updating a product database using a secure website according to at least one example embodiment. According to some example embodiments, in operation S610, the authentication server 300 may generate and provide (e.g., serve, host, etc.) a secure website 322 to a terminal of at least one visitor (e.g., an authorized party), and/or establish a secure connection with, the terminal of the at least one visitor. The visitor may be an operator of the mobile authentication device 200, a provider of an item, product, etc., to be examined 400 (e.g., the item manufacturer, the item creator, the item distributer, etc.), a security feature provider (e.g., the security feature manufacturer, the security feature creator, the security feature distributor, etc.), a public official, etc. The terminal may be the mobile authentication device 200 and/or a computing device capable of establishing a secure and/or encrypted connection with the authentication server 300 over a wired and/or wireless network, such as a personal computer (PC), laptop, a smartphone, a tablet, etc. The secure website 322 may include a user interface that allows the visitor to enter their security credentials for accessing the secure website 322 and/or the secure connection. For example, the security credentials may include one or more of: a username and password; security tokens (e.g., tokens generated by a hardware based security token generator); the inclusion of a public key that is paired with a private key stored by the authentication server 300; the use of a trusted terminal (e.g., the mobile authentication device 200, etc.); the input of biometric information associated with the visitor (e.g., fingerprint information, retina scan information, facial recognition information, etc.) that is collected by the terminal; real-time geolocation and/or geofence information associated with the mobile authentication device 200, etc. In some example embodiments, terminal identification information may also be used as a form of security credential for the visitor. The terminal identification information may be a unique identifier associated with the terminal, such as a serial number of the terminal, a MAC identifier for the terminal, a combination of serial numbers of hardware components of the terminal, etc. Additionally, according to some example embodiments, the terminal identification information and/or the geolocation information may be sent with at least one other type of security credential to the authentication server 300 as part of the authentication and/or validation process. In other words, in some example embodiments, the visitor may be required to use a trusted terminal and/or be within a desired geographic region in order to log into the secure website 322, and the authentication of the trusted terminal may be based on the transmission and verification of the terminal identification information.

In S620, the authentication server 300 receives the security credentials inputted by the visitor into the user interface of the secure website 322 and determines whether the visitor is an authorized user of the secure website 322 by validating and/or authenticating the received security credentials based on the stored security credentials associated with the visitor.

For example, the authentication server 300 may determine that the visitor is an authorized user by matching the received security credentials with the stored security credentials associated with the user account associated with the visitor. In at least one example embodiment, the security credentials may be stored in a secure database associated with the authentication server 300, but the example embodiments are not limited thereto and the authentication of the security credentials may be performed using other techniques, such as through the use of one-way validation methods (e.g., using one-way hashes and/or one-way decryption algorithms that enable the authentication server to verify the security credentials without physically storing a copy of the security credential, etc.). If the authentication server 300 determines that the visitor is not an authorized user of the secure website 322 (e.g., the visitor is not validated and/or is not authenticated, etc.), the visitor is denied access to the secure website 322 and the method returns to operation S610.

In operation S630, if the visitor to the secure website 322 is authorized, validated and/or authenticated, the authentication server 300 performs a lookup (e.g., performs a database lookup) of the account type that is associated with the input security credentials. For example, the authentication server 300 may determine that the account type may be related to a mobile authentication device operator account, a product provider account (e.g., item provider, service provider, and/or object provider, etc.), a security feature provider account, etc., but the example embodiments are not limited thereto.

After the account type of the visitor is determined, in operation S640, the authentication server 300 generates and transmits a second user interface to the visitor's terminal based on the determined account type. For example, if the determined account type is a mobile authentication device operator account (e.g., an operator account), then the second user interface (e.g., an operator user interface) may be generated such that the visitor may request product information database updates for the mobile authentication device (e.g., new and/or updated information related to products to be examined, including security features that may be installed on the products to be examined, information related to identifying the type of product and/or version of the product to be examined, etc.). Additionally, the visitor may input information related to the tracking of the product being examined, such as geolocation information of the examination being conducted, date/time information of the examination being conducted, results of the examination being conducted, etc., into the operator account user interface. Further, the visitor may request that the authentication server 300 perform the processing for identifying the product being examined and/or authenticating the product being examined.

As another example, if the determined account type is a product provider account, the authentication server 300 may generate a product provider user interface as the second user interface. According to at least one example embodiment, the product provider user interface may include interface elements that allow the visitor to upload product information about new products that are commercially available, including product identification information that allows the mobile authentication device 200 to identify the product type and/or product version, product authentication rules and/or restriction information including rules related to determine whether a product type and/or version is authorized for sale and/or authorized for sale in that geographic location, lists of known serial numbers, UPC codes, etc., associated with stolen items, counterfeit items, etc., and security feature information associated with the product, such as a list of security features included in the product, including information regarding the location of security features, etc. Additionally, the product provider user interface may also allow the visitor to update previously uploaded product information, including removing uploaded product information, modifying product information, etc.

As another example, if the determined account type is a security feature provider account, the authentication server 300 may generate a security feature provider account user interface as the second user interface. According to at least one example embodiment, the security feature provider account user interface may include interface elements that allow the visitor to upload security feature information to the authentication server 300. The security feature information may include proprietary sensor configuration information for the security feature detection sensors of the mobile authentication device 200 (e.g., configuration settings that configure the security feature detection sensors to detect the security features, etc.), security feature identification rules (e.g., computer readable instructions that allow the mobile authentication device 200 to identify a security feature, etc.), etc. Additionally the security feature user interface may also allow the visitor to update previously uploaded security feature information, including removing uploaded security feature information, modifying security feature information, etc.

While some example embodiments include a secure website, the example embodiments are not limited thereto and may instead be some form of secure connection with the authentication server 300, such as a SSH connection, a SFTP connection, an encrypted TCP/IP connection, an encrypted UDP connection, an encrypted email, etc.

Various example embodiments are provided that relate to methods, systems, apparatuses and/or non-transitory computer readable media for authenticating security features of a product that includes multiple security features, and more specifically to systems and mobile devices for authenticating security features of a product that includes multiple security features, and methods and non-transitory computer readable media for the same. These example embodiments provide a single mobile authentication device configured to authenticate a plurality of security features and eliminates the need for multiple proprietary inspection tools associated with a subset of the security features installed on a single item to be examined. The example embodiments also provide an automated system for inspecting items that include a plurality of security features. Additionally, at least one example embodiment provides a secure authentication system that allows for the secure transfer of confidential and/or proprietary security feature information so that unauthorized persons are unable to use the security feature information to enable counterfeiting, smuggling, and/or tampering of the product.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A device comprising:
a sensor configured to detect a security feature of a product to be examined;
a display panel;
a memory having stored thereon computer readable instructions; and
processing circuitry configured to execute the computer readable instructions to cause the device to,
display, on the display panel, human readable instructions for positioning the device for performing an examination of the security feature of the product to be examined using the sensor,
determine whether the sensor is properly positioned relative to the security feature,
examine the security feature of the product using the sensor based on results of the determination,
authenticate the product based on results from the examination,
provide authentication results of the product on the display panel,
transmit the authentication results of the product to a server, the transmission of the authentication results causing the server to update a database, and
transmit current location information associated with the device to the server, the transmission of the current location information causing the server to update product tracking information associated with the product in the database.

2. The device of claim 1, further comprising:
a speaker; and
wherein the processing circuitry is further configured to execute the computer readable instructions to cause the device to,
provide the authentication results of the product using the speaker.

3. The device of claim 1, wherein
the product to be examined is a legally restricted product; and
the transmission of the authentication results further causes the server to:
contact at least one of a product manufacturer of the product to be examined, a brand holder associated with the product to be examined, an intellectual property holder associated with the product to be examined, a law enforcement authority, a public official, a merchant, or any combinations thereof, based on the authentication results of the product to be examined.

4. The device of claim 1, wherein the product to be examined is at least one of:
a passport, a driver license, an identification card, currency, banknotes, a physical product, a product packaging, a shipping manifest, a tax stamp, a shipping container seal, or any combinations thereof.

5. The device of claim 1, wherein the security feature is at least one of:
a security thread, a three-dimensional (3-D) security ribbon, a watermark, a color-shifting ink, a microprint, a spare out, an infra-red (IR) taggant, an ultra-violet (UV) taggant, a variable image, an encrypted barcode, anti-tamper slits, a hologram, a magnetic ink, a conductive ink, a thermal ink, a hot stamping foil, intentional misspellings, or any combinations thereof.

6. The device of claim 1, wherein the processing circuitry is further configured to execute the computer readable instructions to cause the device to:

obtain sensor configuration information for the sensor from a server, the sensor configuration information associated with the security feature of the product to be examined and position information associated with an expected position of the security feature;
configure the sensor based on the obtained sensor configuration information; and
authenticate the product using the configured sensor.

7. The device of claim 6, wherein the obtained sensor configuration information includes sensor configuration settings related to at least one of a desired filtration setting, a desired fluorescence setting, a desired frequency response range, a desired absorption response range, a desired magnification setting, a desired polarization setting, or any combinations thereof.

8. The device of claim 1, wherein the processing circuitry is further configured to execute the computer readable instructions to cause the device to:
obtain a target image of the product to be examined;
identify the product to be examined using an identifier of the product to be examined included in the target image, the identifier including at least one of a serial number, UPC barcode, QR code, product logo, identifying graphical design, or any combinations thereof; and
analyze the target image using product authentication rules associated with the identified product stored in the memory.

9. The device of claim 1, wherein the processing circuitry is further configured to execute the computer readable instructions to cause the device to:
obtain a target image of the product to be examined; and
transmit the target image to a server, and wherein
the transmitting the target image causes the server to,
identify the product to be examined using an identifier of the product to be examined included in the target image, the identifier including at least one of a serial number, UPC barcode, QR code, product logo, identifying graphical design, or any combinations thereof, and
analyze the target image using product authentication rules associated with the identified product stored in memory of the server.

10. A method of operating a device, comprising:
displaying, on a display panel of the device, human readable instructions for positioning the device to perform an examination of a security feature of a product to be examined using a sensor associated with the device,
determining whether the sensor is properly positioned relative to the security feature;
examining the security feature of the product using the sensor based on results of the determination;
authenticating the product based on results from the examination;
providing authentication results of the product on the display panel;
transmitting the authentication results of the product to a server, the transmitting of the authentication results causing the server to update a database; and
transmitting current location information associated with the device to the server, the transmitting of the current location information causing the server to update product tracking information associated with the product in the database.

11. The method of claim 10, further comprising:
providing the authentication results of the product using a speaker associated with the device.

12. The method of claim 10, wherein
the product to be examined is a legally restricted product; and
the transmitting the authentication results further causes the server to:
contact at least one of a product manufacturer of the product to be examined, a brand holder associated with the product to be examined, an intellectual property holder associated with the product to be examined, a law enforcement authority, a public official, a merchant, or any combinations thereof, based on the authentication results of the product to be examined.

13. The method of claim 10, wherein the product to be examined is at least one of:
a passport, a driver license, an identification card, currency, banknotes, a physical product, a product packaging, a shipping manifest, a tax stamp, a shipping container seal, or any combinations thereof.

14. The method of claim 10, wherein the security feature is at least one of:
a security thread, a three-dimensional (3-D) security ribbon, a watermark, a color-shifting ink, a microprint, a spare out, an infra-red (IR) taggant, an ultra-violet (UV) taggant, a variable image, an encrypted barcode, anti-tamper slits, a hologram, a magnetic ink, a conductive ink, a thermal ink, a hot stamping foil, intentional misspellings, or any combinations thereof.

15. The method of claim 10, further comprising:
obtaining sensor configuration information for the sensor from a server, the sensor configuration information associated with the security feature of the product to be examined and position information associated with an expected position of the security feature;
configuring the sensor based on the obtained sensor configuration information; and
authenticating the product using the configured sensor.

16. The method of claim 15, wherein the obtained sensor configuration information includes sensor configuration settings related to at least one of a desired filtration setting, a desired fluorescence setting, a desired frequency response range, a desired absorption response range, a desired magnification setting, a desired polarization setting, or any combinations thereof.

17. The method of claim 10, further comprising:
obtaining a target image of the product to be examined;
identifying the product to be examined using an identifier of the product to be examined included in the target image, the identifier including at least one of a serial number, UPC barcode, QR code, product logo, identifying graphical design, or any combinations thereof; and
analyze the target image using product authentication rules associated with the identified product stored in memory of the device.

18. The method of claim 10, further comprising:
obtaining a target image of the product to be examined; and
transmitting the target image to a server, and wherein
the transmitting the target image causes the server to,
identify the product to be examined using an identifier of the product to be examined included in the target image, the identifier including at least one of a serial number, UPC barcode, QR code, product logo, identifying graphical design, or any combinations thereof, and analyze the target image using product authentication rules associated with the identified product stored in memory of the server.

* * * * *